US008488629B2

(12) United States Patent
Bunn et al.

(10) Patent No.: US 8,488,629 B2
(45) Date of Patent: **\*Jul. 16, 2013**

(54) SPECIALIZED DATA TRANSFER IN A WIRELESS COMMUNICATION SYSTEM

(75) Inventors: Fred Bunn, Roswell, GA (US); Tom Johnson, Gainesville, FL (US)

(73) Assignee: Broadcom Corporation, Irvine, CA (US)

( * ) Notice: Subject to any disclaimer, the term of this patent is extended or adjusted under 35 U.S.C. 154(b) by 268 days.

This patent is subject to a terminal disclaimer.

(21) Appl. No.: 12/852,138

(22) Filed: Aug. 6, 2010

(65) Prior Publication Data

US 2010/0303018 A1    Dec. 2, 2010

Related U.S. Application Data

(63) Continuation of application No. 11/878,123, filed on Jul. 20, 2007, now Pat. No. 7,773,631, which is a continuation of application No. 09/783,403, filed on Feb. 15, 2001, now Pat. No. 7,388,884.

(51) Int. Cl.
*H04J 3/24* (2006.01)
*G06F 15/16* (2006.01)

(52) U.S. Cl.
USPC .......................................... 370/474; 709/247

(58) Field of Classification Search
None
See application file for complete search history.

(56) References Cited

U.S. PATENT DOCUMENTS

| | | |
|---|---|---|
| 4,534,024 A | 8/1985 | Maxemchuk et al. |
| 4,712,210 A | 12/1987 | Davis et al. |
| 5,341,374 A | 8/1994 | Lewen et al. |
| 5,421,030 A | 5/1995 | Baran |
| 5,425,027 A | 6/1995 | Baran |
| 5,469,495 A | 11/1995 | Beveridge |
| 5,515,379 A | 5/1996 | Crisler et al. |
| 5,539,449 A | 7/1996 | Blahut et al. |
| 5,570,355 A | 10/1996 | Dail et al. |
| 5,606,561 A | 2/1997 | Scheibel, Jr. et al. |
| 5,742,592 A | 4/1998 | Scholefield et al. |
| 5,756,280 A | 5/1998 | Soora et al. |
| 5,850,400 A | 12/1998 | Eames et al. |
| 5,963,557 A | 10/1999 | Eng |
| 5,982,780 A | 11/1999 | Bohm et al. |

(Continued)

FOREIGN PATENT DOCUMENTS

WO    WO 99/45678 A1    9/1999

OTHER PUBLICATIONS

International Search Report, Application No. PCT/US01/04818, issued Aug. 14, 2001, 3 pages.

(Continued)

*Primary Examiner* — Gregory Sefcheck
(74) *Attorney, Agent, or Firm* — Sterne, Kessler, Goldstein & Fox PLLC

(57) ABSTRACT

A wireless communication system and method is provided for the transfer and processing of data in accordance with specialized data transfer protocols while utilizing conventional base station equipment. For example, the wireless communication system may include a subscriber station that provides for the modification of data packets in accordance with a proprietary protocol and the addressing of the modified data packets to a server. The server is adapted to reconstruct the data packets for transmission to other local subscriber stations or to a packet-switched network. In additional embodiments, the base station itself rather than a server operates to reconstruct the data packets.

20 Claims, 6 Drawing Sheets

U.S. PATENT DOCUMENTS

| | | | |
|---|---|---|---|
| 6,032,197 A | 2/2000 | Birdwell et al. | |
| 6,055,268 A | 4/2000 | Timm et al. | |
| 6,151,297 A | 11/2000 | Congdon et al. | |
| 6,185,224 B1 | 2/2001 | Limb et al. | |
| 6,230,326 B1 | 5/2001 | Unger et al. | |
| 6,233,687 B1 | 5/2001 | White | |
| 6,259,695 B1 | 7/2001 | Ofek | |
| 6,438,123 B1 * | 8/2002 | Chapman | 370/351 |
| 6,466,986 B1 | 10/2002 | Sawyer et al. | |
| 6,483,842 B1 * | 11/2002 | Mauger | 370/420 |
| 6,484,318 B1 | 11/2002 | Shioda et al. | |
| 6,510,162 B1 | 1/2003 | Fijolek et al. | |
| 6,580,730 B1 | 6/2003 | Loukianov | |
| 6,618,386 B1 | 9/2003 | Liu et al. | |
| 6,643,780 B1 | 11/2003 | Cooper | |
| 6,715,075 B1 | 3/2004 | Loukianov | |
| 6,732,179 B1 | 5/2004 | Brown et al. | |
| 6,788,707 B1 | 9/2004 | Horton et al. | |
| 6,804,251 B1 | 10/2004 | Limb et al. | |
| 6,963,931 B2 | 11/2005 | Bunn et al. | |
| 6,993,007 B2 | 1/2006 | Gummalla et al. | |
| 6,999,414 B2 | 2/2006 | Gummalla et al. | |
| 7,113,484 B1 * | 9/2006 | Chapman et al. | 370/252 |
| 7,129,860 B2 * | 10/2006 | Alvarez et al. | 341/51 |
| 7,130,314 B2 | 10/2006 | Bunn et al. | |
| 7,203,164 B2 | 4/2007 | Gummalla et al. | |
| 7,266,686 B1 * | 9/2007 | Monteiro et al. | 713/161 |
| 7,388,884 B2 * | 6/2008 | Bunn et al. | 370/474 |
| 7,433,352 B2 * | 10/2008 | Horton et al. | 370/389 |
| 7,643,538 B2 * | 1/2010 | Currivan et al. | 375/144 |
| 7,656,890 B2 * | 2/2010 | Chapman et al. | 370/431 |
| 7,672,230 B2 * | 3/2010 | Chapman et al. | 370/225 |
| 7,688,826 B2 * | 3/2010 | Horton et al. | 370/392 |
| 7,710,960 B2 * | 5/2010 | Horton et al. | 370/389 |
| 7,769,047 B2 * | 8/2010 | Bunn et al. | 370/474 |
| 7,773,631 B2 * | 8/2010 | Bunn et al. | 370/474 |
| 7,856,049 B2 * | 12/2010 | Currivan et al. | 375/222 |
| 8,023,508 B2 * | 9/2011 | Horton et al. | 370/389 |
| 2001/0030975 A1 | 10/2001 | Limb et al. | |
| 2001/0053152 A1 | 12/2001 | Sala et al. | |
| 2002/0065907 A1 * | 5/2002 | Cloonan et al. | 709/223 |
| 2008/0274729 A1 * | 11/2008 | Kim et al. | 455/423 |

OTHER PUBLICATIONS

Limb, John O. and Sala, Dolors, "A Protocol for Efficient Transfer of Data over Hybrid Fiber/Coax Systems," article in IEEE/ACM Transactions on Networking, vol. 5, No. 6, pp. 872-881, Dec. 1997.

Sumner, Mark, "DOCSIS 1.1 Overview," CableLabs, http://www.cablemodem.com, pp. 1-16., May 3-7, 1999, Copyright 1999.

* cited by examiner

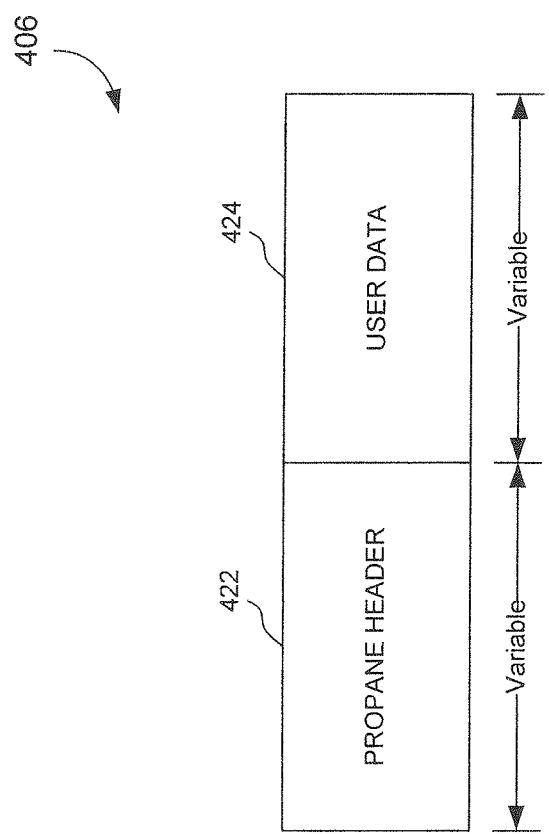

SPECIALIZED DATA TRANSFER IN A WIRELESS COMMUNICATION SYSTEM

CROSS-REFERENCE TO RELATED APPLICATIONS

This application is a continuation of U.S. patent application Ser. No. 11/878,123, entitled "Specialized Data Transfer in a Wireless Communication System", filed Jul. 20, 2007, issued as U.S. Pat. No. 7,773,631 on Aug. 10, 2010, which is a continuation of U.S. patent application Ser. No. 09/783,403, filed Feb. 15, 2001, issued as U.S. Pat. No. 7,388,884 on Jun. 17, 2008, both of which are hereby incorporated by reference in their entireties herein.

This application is related to U.S. patent application Ser. No. 09/427,792, entitled "System and Method for Multiplexing Data from Multiple Sources," filed Oct. 27, 1999, now U.S. Pat. No. 6,804,251; U.S. patent application Ser. No. 09/783,311, entitled "System and Method for Combining Requests for Data Packets by a Data Provider for Transmission of Data Over an Asynchronous Communication Medium," filed Feb. 15, 2001, now U.S. Pat. No. 6,999,414; U.S. patent application Ser. No. 09/783,404, entitled "Method, System and Computer Program Product for Scheduling Upstream Communications," filed Feb. 15, 2001, now U.S. Pat. No. 7,333,495; U.S. patent application Ser. No. 09/783,405, entitled "System and Method for Suppressing Silence in Voice Traffic over an Asynchronous Communication Medium," filed Feb. 15, 2001, now U.S. Pat. No. 6,993,007; and U.S. patent application Ser. No. 09/785,020, entitled "Voice Architecture for Transmission Over a Shared, Contention Based Medium," filed Feb. 15, 2001, now U.S. Pat. No. 7,203,164, all of which are incorporated by reference in their entireties herein.

BACKGROUND OF THE INVENTION

1. Field of the Invention

The present invention relates generally to wireless communication systems, and more specifically to specialized data transfer in a wireless communication system.

2. Background

Conventional cable modem systems utilize DOCSIS-compliant equipment and protocols to transfer data between one or more cable modems (CM) and a cable modem termination system (CMTS). DOCSIS (Data Over Cable System Interface Specification) generally refers to a group of specifications that define industry standards for cable headend and cable modem equipment. In part, DOCSIS sets forth requirements and objectives for various aspects of cable modem systems including operations support systems, management, data interfaces, as well as network layer, data link layer, and physical layer transport for cable modem systems.

At a high level, DOCSIS comprises a four-way handshake protocol with the following message exchange: (1) request for bandwidth for data transmission by a cable modem, (2) grant of request by the CMTS, (3) upstream slot specification by the CMTS, and (4) subsequent data transmission by the cable modem. Both slot specification and grant messages are encapsulated in a single DOCSIS message known as the Map, which in fact includes all feedback from the CMTS to cable modems related to the normal mode of operation of the DOCSIS protocol.

After the grant from the CMTS has been received by the cable modem, the upstream channel may be viewed as a continuous flow of mini-slots that may be used to transmit data in ways that depart from, and are more efficient than, standard DOCSIS protocols. For example, voice and data packets may be processed by the cable modem to reduce the number of bits transferred per packet through the elimination of protocol overhead. In particular, a proprietary protocol-specific header compression technique may be used to reduce the size of various protocol headers within a given DOCSIS packet. The use of a protocol-specific header compression technique presents a distinct advantage over DOCSIS 1.0, which does not provide for header suppression, as well as over DOCSIS 1.1, which only permits header suppression based on the presence of redundant bit sequences in sequentially-transmitted packets.

Techniques that reduce the number of bits transferred per packet as described above require additional processing by the CMTS to reconstruct the original DOCSIS packet and the protocol headers included therein so that the packet may be properly handled at the cable headend. However, conventional CMTS equipment does not provide for such additional processing capabilities. Moreover, the cost of replacing or upgrading existing CMTS equipment to provide for these capabilities may be prohibitively expensive. Accordingly, what is desired is a cable modem system and method for data transfer that provides for specialized headend processing of modified DOCSIS packets while utilizing existing conventional CMTS equipment with little or no modification.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 4C depicts a packet format used for data transfer in a cable modem system in accordance with an alternate embodiment of the present invention.

Figure 1:
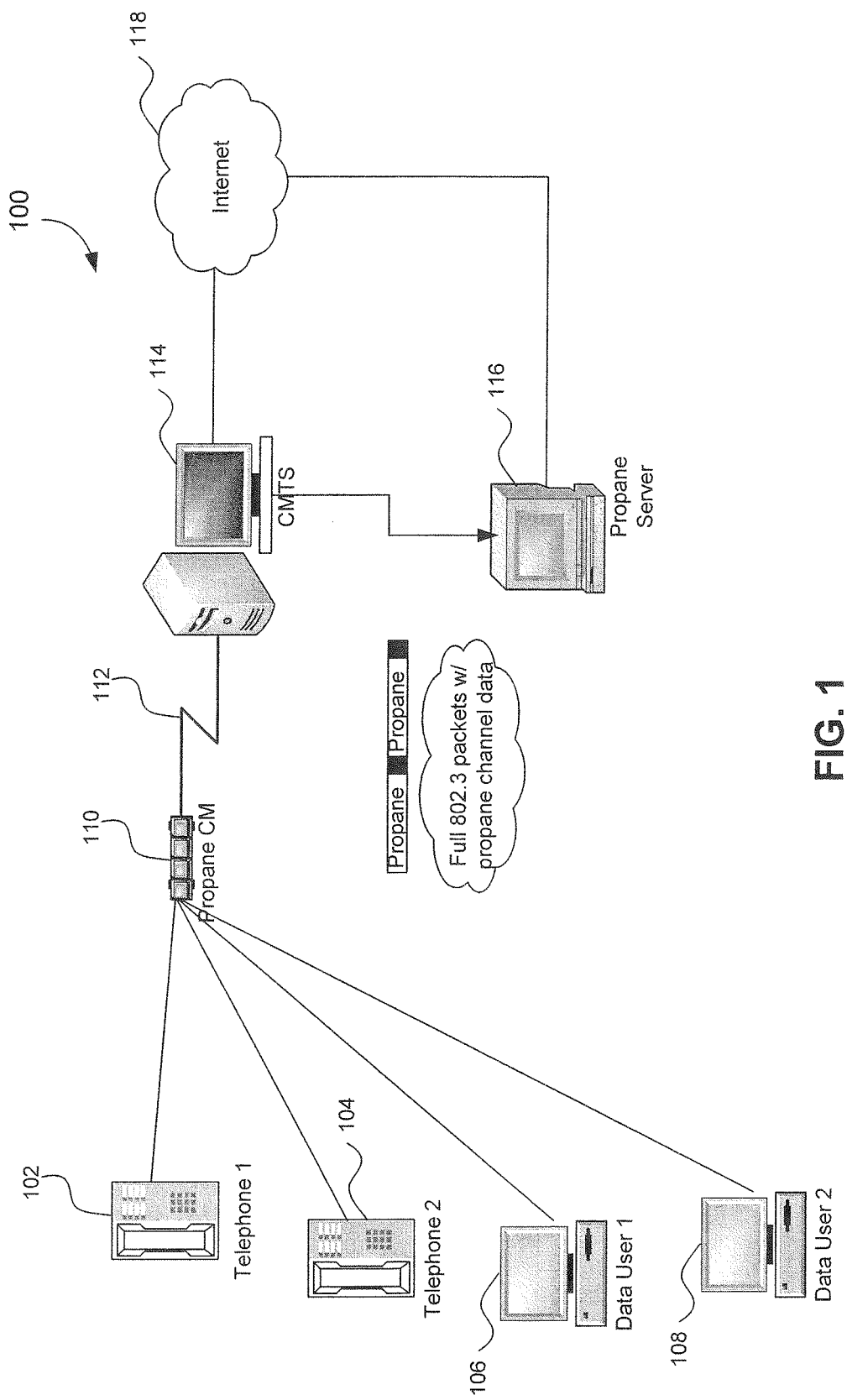
FIG. 1 is a high level block diagram of a cable modem system in accordance with embodiments of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Table of Contents

A. Cable Modem System in accordance with Embodiments of the Present Invention

B. Modification and Reconstruction of Data Packets in Accordance with Embodiments of the Present Invention
C. Specialized Data Transfer Protocols in Accordance with Embodiments of the Present Invention
D. Alternate Modulation/Demodulation Systems in Accordance with an Embodiment of the Present Invention
E. Conclusion

A. CABLE MODEM SYSTEM IN ACCORDANCE WITH EMBODIMENTS OF THE PRESENT INVENTION

FIG. 1 is a high level block diagram of an example cable modem system 100 in accordance with embodiments of the present invention. Cable modem system 100 includes a cable modem 110, a cable network 112, a cable modem termination system (CMTS) 114, and a headend server 116.

The cable modem 110 operates as an interface between a plurality of attached user devices and the cable network 112 and permits the user devices to send and receive data over the cable network 112. In the cable modem system 100, the user devices include a first telephone 102, a second telephone 104, a first data user 106 and a second data user 108. In embodiments, first and second telephones 102 and 104 comprise VoIP-enabled phones adapted for voice communication over a packet-switched network. In embodiments, first data user 106 and second data user 108 comprise a personal computer, data terminal equipment, or any other user device capable of running applications that send and receive data over a packet-switched network. In the example cable modem system 100, only one cable modem 110 and four user devices 102, 104, 106 and 108 are shown for clarity. In general, any number of cable modems and any number of user devices can be included in the cable modem system of the present invention.

The cable network 112 connects the cable modem 110 to the CMTS 114 and permits the transfer of data between these system elements. In embodiments, the cable network 112 can comprise coaxial cable, fiberoptic cable, or a combination of coaxial cable and fiberoptic cable linked via a fiber node.

The CMTS 114 is a headend element that controls the upstream and downstream transfer of data between itself and cable modem 110, as well as any other cable modems to which it may be attached by means of the cable network 112. In embodiments of the present invention, the CMTS 114 comprises DOCSIS-compliant hardware and software that controls the transfer of data between itself and cable modem 110 in accordance with the DOCSIS specifications. Accordingly, the CMTS 114 engages in a four-way handshake protocol with the cable modem 110 that includes the following message exchange: (1) request for bandwidth for data transmission by the cable modem 110, (2) grant of request by the CMTS 114, (3) upstream slot specification by the CMTS 114, and (4) subsequent data transmission by the cable modem 110. Both slot specification and grant messages are encapsulated in a single DOCSIS message known as the Map, which in fact includes all feedback from the CMTS 114 to the cable modem 110 related to the normal mode of operation of the DOCSIS protocol.

The CMTS 114 also acts as an interface between the cable network 112 and the Internet 118 and processes data received from the cable modem 110 that is directed to the Internet for transfer to the Internet 118. As will be discussed in more detail below, in embodiments of the present invention, the CMTS 114 will forward certain types of data received from the cable modem 110 to the headend server 116 for additional processing before the data may be transferred to the Internet 118. The CMTS 114 also acts as an interface between cable modem 110 and other cable modems on the cable network 112. For example, the CMTS 114 can transfer data between cable modem 110 and another cable modem (not shown) on the cable network 112.

B. MODIFICATION AND RECONSTRUCTION OF DATA PACKETS IN ACCORDANCE WITH EMBODIMENTS OF THE PRESENT INVENTION

In accordance with the present invention, the cable modem 110 and the headend server 116 are adapted to send and receive data, respectively, in proprietary formats that deviate from standard DOCSIS protocols. In embodiments, the cable modem 110 is adapted to modify data packets in accordance with a proprietary header compression scheme prior to transmission over the cable network 112, and the headend server 116 is adapted to reconstruct the modified DOCSIS packets that are received from the cable modem 110 via the cable network 112 and the CMTS 114.

Figure 2:
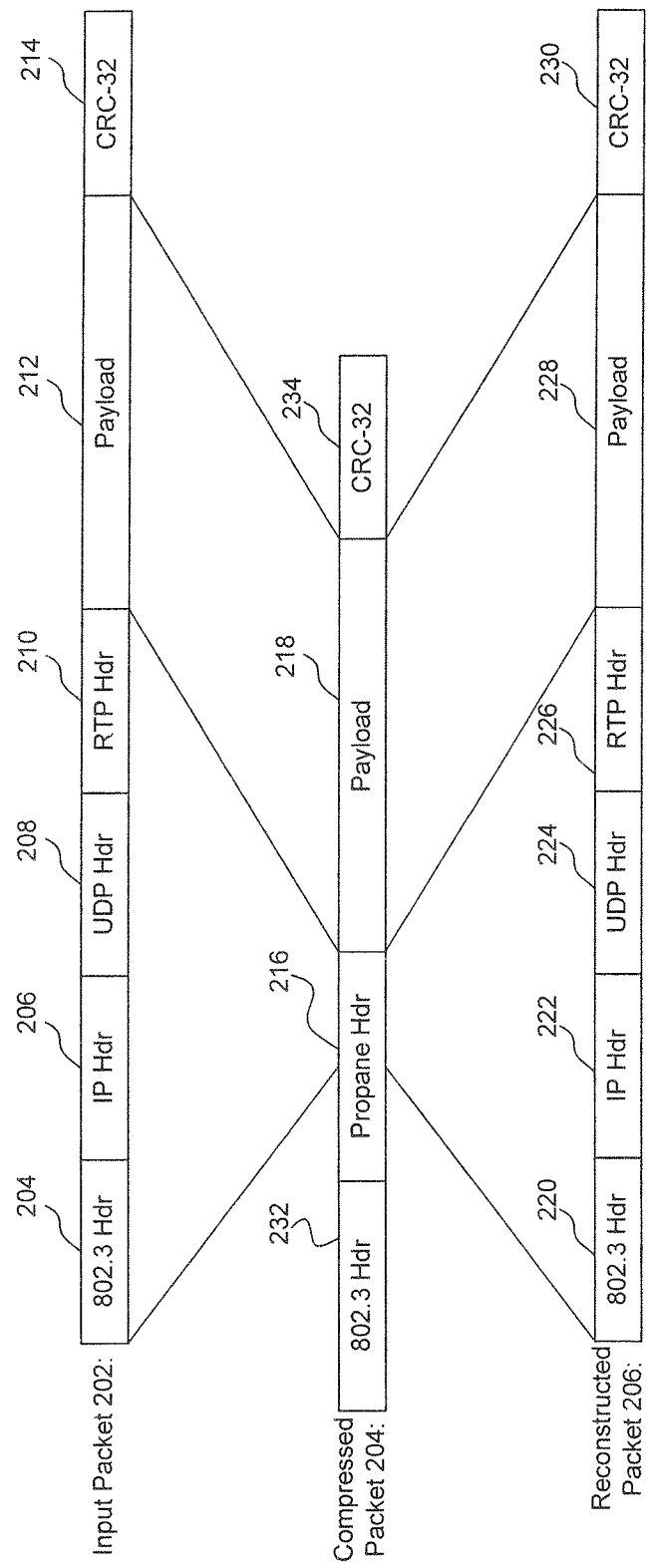
FIG. 2 depicts various packet formats used for the transfer of data in a cable modem system in accordance with embodiments of the present invention.

FIG. 2 is useful for explaining a manner in which packets are modified by the cable modem 110 and reconstructed by the headend server 116 in accordance with embodiments of the present invention. More specifically, FIG. 2 illustrates an input packet 202, a compressed packet 204, and a reconstructed packet 206 in accordance with embodiments of the present invention.

Input packet 202 represents a data packet generated by a user device for transmission over the cable network 112. The input packet 202 includes an 802.3 header 204, an IP header 206, a UDP header 208, an RTP header 210, a data payload 212, and a CRC field 214.

In embodiments, the input packet 202 can be generated by an application program running on the first data user 106 described above in reference to FIG. 1. For example, an application program running on the first data user 106 may generate voice or data information for transmission over the cable network 112 to a local cable modem or to the Internet. This voice or data information comprises the data payload 212 of the input packet 202. An application program or operating system routine running on the on the first data user 106 will append the IP header 206, UDP header 208, RTP header 210 and CRC field 214 to the data payload so that it may be transmitted in accordance with standard IP protocols. An Ethernet card within the first data user 106 will further append the 802.3 header to the packet so that the input packet may be transmitted in accordance with standard Ethernet protocols.

The input packet 202 is transmitted to the cable modem 110, which determines whether or not the header information in the input packet 202 may be suppressed in accordance with a proprietary header suppression scheme. In embodiments, the proprietary header suppression scheme is a protocol-specific header suppression scheme that predictively modifies header fields based on an a priori knowledge of the various protocols with which the headers are associated.

If the header information may be suppressed, the cable modem 110 will suppress the 802.3 header 204, the IP header 206, the UDP header 208 and the RTP header 210. In an embodiment, all of the 802.3, IP, UDP and RTP headers are eliminated and replaced with a single byte reconstruction index. In the instance where the input packet 202 is a voice packet (i.e., the payload 212 is a voice payload), this scheme yields a 14-byte advantage per voice packet over the DOCSIS 1.1 header suppression technique.

By performing header suppression on the input packet 202, the cable modem generates a "compressed" data packet 204 for transmission over the DOCSIS network. As shown in FIG.

2, the compressed data packet 204 includes a new 802.3 header 232, a proprietary header 216, a payload 218, and a new CRC field 234. In embodiments, the payload 212 is not compressed and therefore the payload 218 is identical to the payload 212 of the input packet 202.

The proprietary header 216 includes information that indicates to a recipient of the compressed packet how to reconstruct it. In embodiments, this information includes an identification of the cable modem from which the compressed packet 204 has been transmitted.

In addition to performing header suppression on the input packet 202, the cable modem 110 also places a new 802.3 header 232 on the compressed packet 204. The new 802.3 header is necessary to address the compressed packet 204 to the headend server 116 which will reconstruct the compressed packet 204 in accordance with the proprietary header suppression protocol. By appending the new 802.3 header 232 addressed to the headend server 116 onto the compressed packet 204, the cable modem 110 assures that the compressed packet 204 will be passed to the headend server 116 by the CMTS 114 for the necessary additional processing instead of being processed by the CMTS 114 and transmitted to the Internet 118.

In an alternate embodiment, the headend server 116 may not be directly connected to the CMTS 114 but instead be connected via the Internet 118. In such an alternate embodiment, the cable modem 110 would have to place a new IP address on the front of the compressed data packet 204 in addition to the new 802.3 header 232 in order to address compressed data packets to the headend server. The present invention is directed to such an alternative embodiment.

The headend server 116 is adapted to reconstruct the compressed data packet 204 in accordance with the proprietary header suppression protocol to generate a reconstructed data packet 206. As shown in FIG. 2, a portion of the proprietary header 216 from the compressed packet 204 is expanded into a standard 802.3 header 220, an IP header 222, a UDP header 224 and an RTP header 226 in the reconstructed packet 206. These headers are identical to the 802.3 header 204, IP header 206, UDP header 208 and RTP header 210 of the input packet 202. The headend server 116 also generates a new CRC field 230. The payload 228 of the reconstructed packet 206 is identical to the payload of the compressed packet 204.

After the headend server 116 has generated the reconstructed packet 206, it can send it back to the CMTS 114 for transfer to another cable modem on the cable network 112 or to the Internet 118, or the headend server 116 can transfer the reconstructed packet 206 directly to the Internet 118.

C. SPECIALIZED DATA TRANSFER PROTOCOLS IN ACCORDANCE WITH EMBODIMENTS OF THE PRESENT INVENTION

Figure 3:
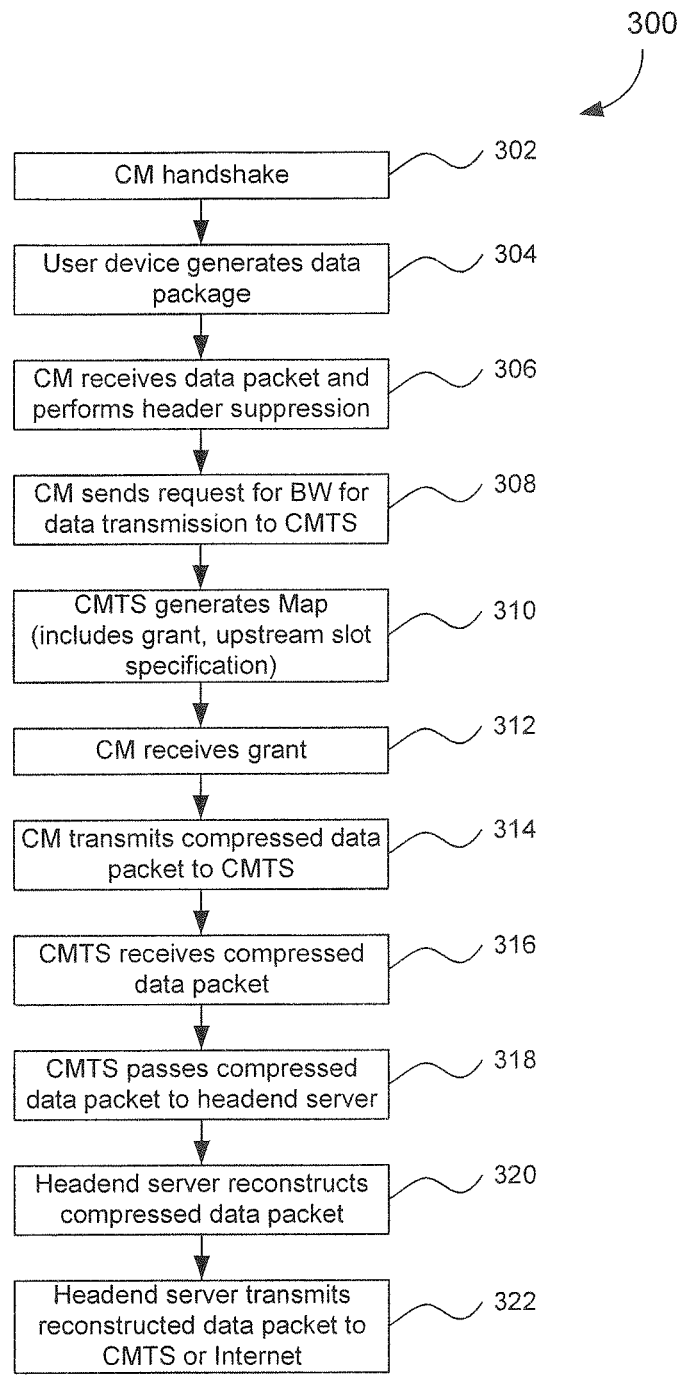
FIG. 3 is a flowchart of a method for specialized data transfer in a cable modem system in accordance with embodiments of the present invention.

FIG. 3 depicts a flowchart 300 of a method for specialized data transfer in a cable modem system in accordance with embodiments of the present invention. The invention, however, is not limited to the description provided by the flowchart 300. Rather, it will be apparent to persons skilled in the art from the teachings provided herein that other functional flows are within the scope and spirit of the present invention. The flowchart 300 will be described with continued reference to the example cable modem system 100 of FIG. 1.

At step 302, the cable modem 110 is turned on and initiates a handshaking routine with the CMTS 114 via the cable network 112 to inform the CMTS 114 that the cable modem 110 is now present and active on the cable network 112. During the handshaking process, the cable modem 110 downloads a configuration file from the CMTS 114 that includes the address information for the headend server 116. The cable modem 110 then sends identification and configuration information to the headend server 116 using standard DOCSIS packets. In response, the headend server 116 allocates internal memory that is used to store configuration information for the cable modem 110. In embodiments, the headend server 116 also allocates internal memory that is used to store packets received from the cable modem 110. Previously received packet information can be used by the headend server 116 to reconstruct compressed packets received from the cable modem 110, where the compression scheme is based in part on sending only incremental changes to the fields of a packet.

At step 304, a user device (e.g., first telephone 102, second telephone 104, first data user 106, or second data user 108) generates a data packet for transmission over the cable network 112. In embodiments, the data packet may comprise the input packet 202 of FIG. 2.

At step 306, the cable modem 110 receives the data packet from the user device and performs header suppression as appropriate in accordance with a proprietary header suppression routine as described in more detail in reference to FIG. 2, above. The cable modem 110 thereby generates a compressed data packet with a new 802.3 header address that directs the compressed data packet to the headend server 116. In embodiments, the compressed data packet may comprise the compressed data packet 204 of FIG. 2.

At step 308, the cable modem 110 sends a request for bandwidth for data transmission to the CMTS 114 in accordance with the DOCSIS protocol.

At step 310, the CMTS 114 generates a Map that grants the request and provides upstream slot specification to the cable modem 110.

At step 312, the cable modem 110 receives the grant via the Map message from the CMTS 114.

At step 314, the cable modem 110 utilizes its slot to transmit the compressed data packet to the CMTS 114.

At step 316, the CMTS 114 receives the compressed data packet and examines the new 802.3 header. Because the new 802.3 header is addressed to the headend server 116, the CMTS 114 will pass the compressed data packet to the headend server 116 instead of processing it as a standard DOCSIS packet, as shown at step 318.

At step 320, the headend server 116 receives the compressed data packet, removes the new 802.3 header, and reconstructs the compressed data packet to generate a reconstructed data packet in accordance with a proprietary header suppression protocol. In embodiments, the reconstructed data packet comprises the reconstructed data packet 206 of FIG. 2.

At step 322, the headend server 116 sends the reconstructed data packet back to the CMTS 114 for transfer to another cable modem on the cable network 112 or to the Internet 118, or the headend server 116 can transfer the reconstructed packet 206 directly to the Internet 118.

D. ALTERNATE CABLE MODEM SYSTEM EMBODIMENTS IN ACCORDANCE WITH THE PRESENT INVENTION

The example cable modem system and methods described above provide for the transfer and headend processing of data in accordance with specialized data transfer protocols while utilizing conventional cable modem termination system (CMTS) equipment and software. Because the above described system and methods utilize an Ethernet-addressable headend server to perform reconstruction of data packets modified in accordance with a proprietary data transfer protocol, no modification of CMTS equipment or software is required. It should be noted that where a CMTS includes a router that directly passes packets to the Internet backbone, some software modification may be required to redirect compressed packets to the headend server. However, such software modification would be very minimal and inexpensive.

An alternate cable modem system embodiment in accordance with the present invention utilizes CMTS software components to perform the reconstruction functions described above in regard to the headend server 116 of FIG. 1. Such a configuration would provide for improved bandwidth utilization on the cable network.

Figure 4A:
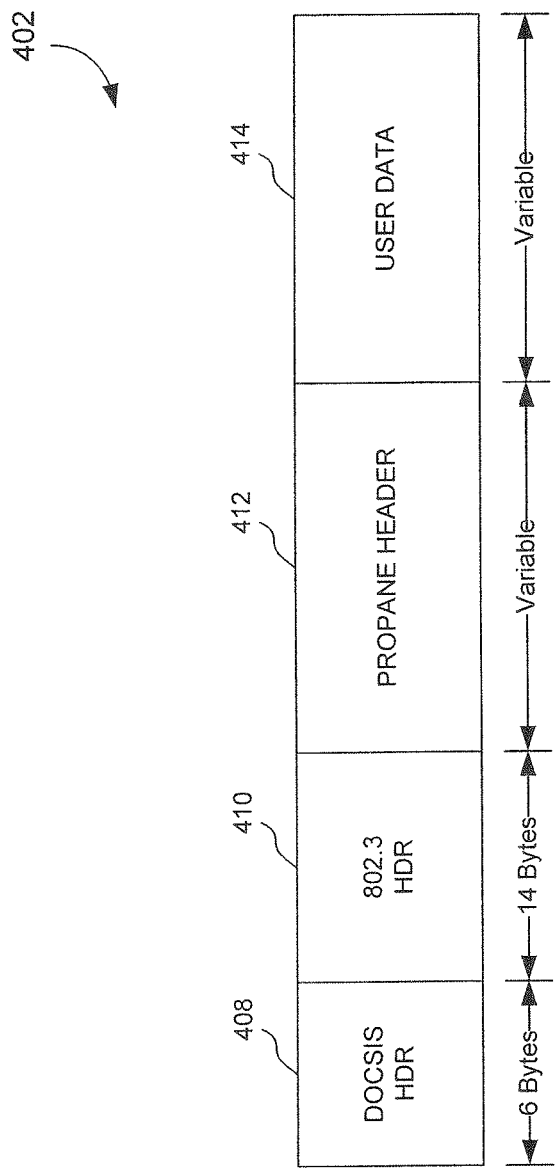
FIG. 4A depicts a packet format used for data transfer in a cable modem system in accordance with an embodiment of the present invention.

For example, FIG. 4A depicts an example packet layout 402 for a compressed packet sent in accordance with the cable modem system 100 of FIG. 1 and/or in accordance with the method of FIG. 3. In other words, FIG. 4A depicts an example packet layout 402 for a compressed packet sent in accordance with a cable modem system in which the reconstruction of compressed packets is performed by a specialized headend server as opposed to by the CMTS itself. The packet 402 includes a 6-byte DOCSIS header 408 for compatibility with CMTS hardware, an 8-byte 802.3 header for addressing the specialized headend server, a variable-length proprietary header 412 that contains the compressed header information, and a variable-length user data field 414.

Figure 4B:
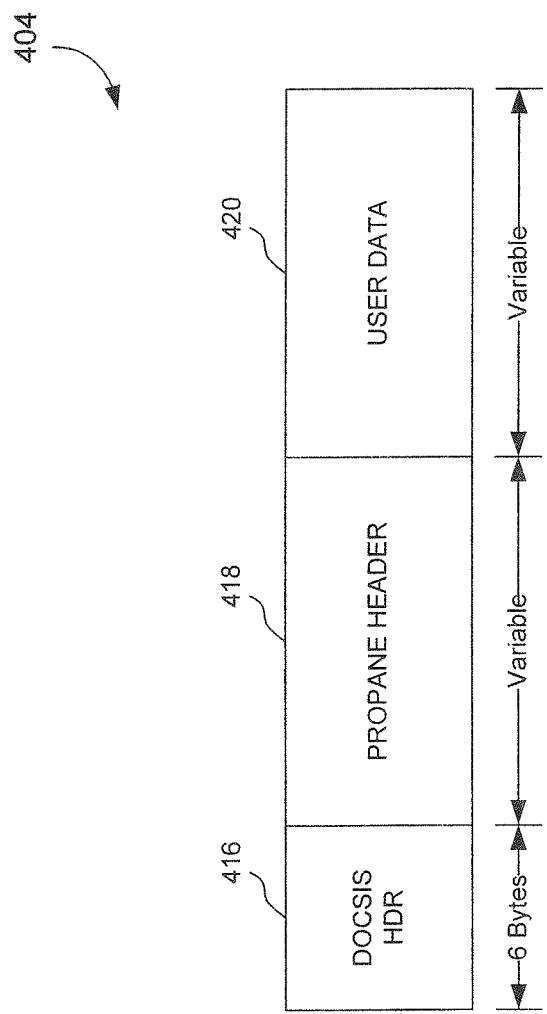
FIG. 4B depicts a packet format used for data transfer in a cable modem system in accordance with an alternate embodiment of the present invention.

In contrast, FIG. 4B depicts an example packet layout 404 for a compressed packet sent in accordance with a cable modem system in which the CMTS software components, as opposed to the headend server, perform the reconstruction of compressed packets. The packet 404 still requires a DOCSIS header 416 for compatibility with CMTS hardware, and, like the packet 402, the packet 404 includes a variable-length proprietary header 418 that contains the compressed header information, and a variable-length user data field 420. However, the packet 404 does not require a 802.3 header because a specialized headend server is not used in this configuration. Thus, a 14-byte savings is achieved.

Further improvements in bandwidth utilization may be achieved where a cable modem system in accordance with the invention utilizes both the CMTS hardware and software, as opposed to just the CMTS software, to perform the reconstruction of compressed packets. FIG. 4C depicts an example packet format 406 for a compressed packet in accordance with such a configuration. As can be seen in FIG. 4C, because the hardware of the CMTS has been modified, the CMTS may receive packets without a DOCSIS header. Thus, the packet 406 consists only of a variable-length proprietary header 422 that contains the compressed header information, and a variable-length user data field 424.

Each of the above configurations is achievable even within the confines of a DOCSIS-compliant system, because DOCSIS is designed to accommodate upstream transmissions from cable modems to the headend on a shared and scheduled medium. More specifically, DOCSIS requires the CMTS to determine the configuration of cable modems that are active on the cable network and to allocate predetermined slots of bandwidth to each modem in response to requests from each cable modem. Accordingly, the CMTS will have the necessary advance information to determine how to handle packets originating from each cable modem on its local cable network, and be able to process them accordingly. Thus, embodiments of the present invention the use of proprietary data transfer algorithms that may vary from modem to modem by allowing the headend equipment to receive modified DOCSIS packets in a DOCSIS-compliant manner.

E. CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A cable network system, comprising:
   a cable modem configured to modify a data packet received from a user device in accordance with a first data transfer protocol to provide a modified data packet appended with a first header and a second header;
   a cable modem termination system (CMTS) configured to route the modified data packet in accordance with a second data transfer protocol utilizing information within the first header; and
   a server configured to be compliant with the second data transfer protocol but not the first data transfer protocol, and to reconstruct the data packet from the modified data packet received from the CMTS utilizing information within the second header, in accordance with the second data transfer protocol.

2. The cable network system of claim 1, wherein the data packet includes a user device header; and
   wherein the cable modem is further configured to determine if the user device header can be suppressed in accordance with the first data transfer protocol.

3. The cable network system of claim 2,
   wherein the cable modem is further configured to suppress the user device header; and
   wherein the server is further configured to restore the user device header utilizing information within the second header.

4. The cable network system of claim 1, wherein the first header includes an internet protocol (IP) address of the server.

5. The cable network system of claim 4, wherein the cable modem is further configured to download the IP address from the CMTS.

6. The cable network system of claim 1, wherein the second header includes restoration data instructions.

7. The cable network system of claim 1, wherein the second data transfer protocol is a standard Data Over Cable Service Interface Specification (DOCSIS) protocol, and wherein the first data transfer protocol is a non-standard DOCSIS protocol.

8. In a cable modem, a method comprising:
   modifying a data packet received from a user device in accordance with a first data transfer protocol to provide a modified data packet;
   appending a first header and a second header to the modified data packet to provide an appended modified data packet; and
   transmitting the appended modified data packet to a cable modem termination system (CMTS) in accordance with a second data transfer protocol;
   wherein the first header enables the CMTS to route the modified data packet to a server, the server being non-compliant with the first data transfer protocol; and
   wherein the second header enables the server to restore the data packet from the modified data packet.

9. The method of claim 8, wherein the data packet includes a user device header, the method further comprising:
   determining if the user device header can be suppressed in accordance with the first data transfer protocol.

10. The method of claim 9, wherein the modifying further comprises:
   suppressing the user device header; and
   wherein the second header enables the server to restore the user device header.

11. The method of claim 8, wherein the appending comprises:
   appending an address of the server as the first header.

12. The method of claim 11, wherein the appending further comprises:
   appending an internet protocol (IP) address as the address of the server.

13. The method of claim 11, further comprising:
   downloading the address of the server from the CMTS.

14. The method of claim 8, wherein the appending comprises:
   appending restoration data instructions as the second header.

15. The method of claim 8, wherein the modifying comprises:
   modifying the data packet, in accordance with a non-standard Data Over Cable Service Interface Specification (DOCSIS) protocol, and wherein the transmitting comprises:
   transmitting the modified data packet to the CMTS in accordance with a standard DOCSIS protocol.

16. In a cable modem, a method comprising:
   modifying data packet fields within a data packet received from a user device in accordance with a standard communications protocol to provide a modified data packet;
   appending a server address and restoration data to the modified data packet to provide an appended modified data packet; and;
   transmitting the appended modified data packet to a cable modem termination system (CMTS) in accordance with a non-standard communications protocol;
   wherein the server address enables the CMTS to route the modified data packet to a server, the server being compliant with the non-standard communications protocol but not the standard communications protocol; and
   wherein the restoration data enables the server to restore the data packet fields from the modified data packet.

17. The method of claim 16, wherein the data packet includes a user device header, the method further comprising:
   determining if the user device header can be suppressed in accordance with the standard communications protocol.

18. The method of claim 17, wherein the modifying further comprises:
   suppressing the user device header; and
   wherein the restoration data enables the server to restore the user device header.

19. The method of claim 16, wherein the modifying comprises:
   modifying the data packet fields in accordance with a standard Data Over Cable Service Interface Specification (DOCSIS) protocol, and wherein the transmitting comprises:
   transmitting the modified data packet to the CMTS in accordance with a non-standard DOCSIS protocol.

20. The method of claim 16, further comprising:
   downloading the server address from the CMTS.

* * * * *

UNITED STATES PATENT AND TRADEMARK OFFICE
CERTIFICATE OF CORRECTION

PATENT NO. : 8,488,629 B2  Page 1 of 1
APPLICATION NO. : 12/852138
DATED : July 16, 2013
INVENTOR(S) : Fred Bunn It is certified that error appears in the above-identified patent and that said Letters Patent is hereby corrected as shown below:

In the claim

Column 10, Line 3, please change "and;" to --and--.

Signed and Sealed this
Twenty-fourth Day of September, 2013

Teresa Stanek Rea
*Deputy Director of the United States Patent and Trademark Office*